United States Patent [19]
Hibst

[11] Patent Number: 4,469,669
[45] Date of Patent: Sep. 4, 1984

[54] PREPARATION OF FERRITES FROM IRON (II) SULFATE

[75] Inventor: Hartmut Hibst, Ludwigshafen, Fed. Rep. of Germany

[73] Assignee: BASF Aktiengesellschaft, Fed. Rep. of Germany

[21] Appl. No.: 484,887

[22] Filed: Apr. 14, 1983

[30] Foreign Application Priority Data

Apr. 14, 1982 [DE] Fed. Rep. of Germany ....... 3213683

[51] Int. Cl.$^3$ ............................................. C01G 49/00
[52] U.S. Cl. .................. 423/594; 252/62.62; 252/62.63
[58] Field of Search ...................... 423/594; 252/62.62, 252/62.63

[56] References Cited

U.S. PATENT DOCUMENTS

| | | | |
|---|---|---|---|
| 3,428,416 | 2/1969 | Gie et al. | 423/594 |
| 3,582,266 | 6/1971 | Sopp et al. | 423/594 |
| 4,292,294 | 9/1981 | Patil et al. | 423/594 |
| 4,401,643 | 8/1983 | Hibst et al. | 423/594 |

Primary Examiner—Herbert T. Carter
Attorney, Agent, or Firm—Keil & Weinkauf

[57] ABSTRACT

M-Type ferrites of the formula $AFe_{12}O_{19}$, $Me_2Y$-type ferrites of the formula $A_2Me_2Fe_{12}O_{22}$ or spinel-type ferrites of the formula $MeFe_2O_4$, where A is Ba, Sr, Pb and/or Ca and Me is Zn, Mn, Co, Cu, Fe(II) and/or $\frac{1}{2}(Li(I)+Fe(III))$, are prepared by a process wherein iron(II) sulfate hydrate is dehydrated and oxidized and then mixed with sodium carbonate and/or potassium carbonate and salts and/or oxides of other A and/or Me cations required in addition to Fe(III) for ferrite formation, the mixture is heated at from 700° to 1,200° C., and the resulting ferrite is isolated by leaching with water.

4 Claims, No Drawings

PREPARATION OF FERRITES FROM IRON (II) SULFATE

The present invention relates to a process for the preparation of M-type ferrites of the formula $AFe_{12}O_{19}$, $Me_2Y$-type ferrites of the formula $A_2Me_2Fe_{12}O_{22}$ or spinel-type ferrites of the formula $MeFe_2O_4$, where A is Ba, Sr, Pb and/or Ca and Me is Zn, Mn, Co, Cu, Fe(II) and/or $\frac{1}{2}$(Li(I)+Fe(III)).

Hexagonal ferrite powders employed for the production of magnetically hard ferrite magnets and of substantially counterfeit-proof magnetic recordings are usually prepared by a ceramic process. For this purpose, barium carbonate or strontium carbonate and iron oxide are mixed in a ratio which corresponds to the chemical formula of the ferrite to be produced, and the mixture is heated, ie. pre-sintered, at from 1,100° to 1,300° C. On pre-sintering, the magnetic hexaferrite is formed. The sintered crystallite agglomerates formed are then milled, generally in the presence of water, to give a powder of particle size about 1 μm. The milling creates crystal defects in the particles, which reduce the coercivity. Ferrite powders produced in this way generally have very good specific remanence, but the coercive force $H_c$ is very low, being about 200 kA/m before milling and less than 150 kA/m after milling. These crystal defects caused by milling can be only partially repaired by heating after milling, or by a sintering process. Consequently, the magnets which are produced from milled magnetically hard barium ferrite powder and which are used in industry at the present time have $H_c$ values of only from 280 to 320 kA/m. Furthermore, the milled ferrite powders exhibit a broad particle size spectrum. Ferrites having a spinel structure, eg. manganese zinc ferrite, are prepared in the same manner.

Furthermore, flux processes for the preparation of the above ferrites have also been disclosed, in which fluxes, for example $B_2O_3$, alkali metal borates, alkali metal ferrites, $Bi_2O_3$, molybdates, alkali metal halides and alkali metal sulfates, are employed to promote the reaction between the individual metal oxides. Thus, according to U.S. Pat. No. 3,793,443, barium ferrite is prepared by heating a $BaCO_3/FeOOH/NaCl/KCl$ mixture. This publication considers that it is important to start from FeOOH as the iron component, in order to effect the ferrite formation in the presence of $H_2O$ produced in situ. Furthermore, complete ferrite formation is observed only at high temperatures, ie. far above the melting point of the added alkali metal chlorides; lower temperatures give low yields of Ba ferrite. The process offers no improvement over the ceramic method in respect of the coercive force that can be achieved. In the process described in U.S. Pat. No. 3,810,973, a suspension of Iron(III) oxide hydroxide in an alkali metal chloride solution is mixed with $BaCO_3$ powder, and the mixture is then spray-dried and heated at 1,000°–1,050° C. German Laid-Open Application DOS No. 2,143,793 describes a process for the preparation of barium ferrite, in which a $BaCO_3/Fe_2O_3/Na_2SO_4/K_2SO_4$ mixture is heated at 950° C. Furthermore, a finely divided barium ferrite pigment which has a very high coercive force can be obtained by heating a spray-dried coprecipitate containing NaCl or $Na_2SO_4$ (German Laid-Open Applications DOS No. 3,042,959 and DOS No. 3,132,677). Similar processes have been described, by means of which hexagonal $Me_2Y$ ferrite powders (German Laid-Open Application DOS No. 3,132,680) and ferrite powders having a spinel structure (German Laid-Open Application DOS No. 3,132,684) can be prepared. Moreover, $BaFe_{12}O_{19}$ (German Laid-Open Application DOS No. 3,132,678), $Me_2Y$ ferrites (German Laid-Open Application DOS No. 3,132,681) and ferrite powders of the spinel type (German Laid-Open Application DOS No. 3,132,683) can be obtained by heating a milled salt mixture containing $FeCl_3$, $Na_2CO_3$ and/or $K_2CO_3$.

Iron(II) sulfate hydrate ($FeSO_4.7H_2O$) is obtained in large amounts as a cheap waste product in a number of chemical processes, for example in the preparation of $TiO_2$ from ilmenite by the sulfate process, or in the dressing of iron sheets. Furthermore, $BaSO_4$ is a widely occurring mineral (heavy spar, barite). $SrSO_4$ occurs naturally as celestite, which constitutes a cheap industrial starting material for the preparation of most strontium compounds.

It is an object of the present invention to convert iron(II) sulfate hydrate into high-quality ferrite powders, in particular of the hexagonal M and $Me_2Y$ types and of the cubic spinel type, by a simple and economical route. It is a further object of the invention to prepare the hexagonal ferrites directly from the mineral heavy spar or barite, or celestite, the resulting ferrite powders having in particular a narrow particle size spectrum, good dispersibility in organic binders and, in particular in the case of M-type barium ferrite, a high $H_c$ value.

We have found that these objects are achieved and that, surprisingly, ferrites having the required properties can be prepared by a simple route if iron(II) sulfate hydrate is dehydrated under a pressure of less than 0.8 bar at from 50° to 350° C. and then heated in an oxidizing gas stream at from 50° to 600° C., the resulting product is mixed with sodium carbonate and/or potassium carbonate and salts and/or oxides of other cations required in addition to Fe(III) for the particular ferrite composition, the mixture obtained is heated at from 700° to 1,200° C. and the resulting ferrite is then isolated by leaching with water.

It is particularly advantageous to heat the iron(II) sulfate hydrate under a pressure of less than 0.1 bar preferably at from 70° to 250° C. until more than 50%, in particular more than 80%, of the water of hydration has been removed. During subsequent heating, preferably at from 180° to 400° C., in an oxidizing gas stream, usually in a stream of air, more than 80% of the divalent iron is converted into trivalent iron.

In carrying out the novel process, it has proved advantageous to carry out the dehydration of the iron(II) sulfate hydrate in a continuously evacuated apparatus in which the temperature is increased progressively. The subsequent oxidation in a stream of air is also advantageously carried out by a procedure in which the temperature is increased progressively.

In addition to $Na_2CO_3$ and/or $K_2CO_3$ and the dehydrated and oxidized iron sulfate, the reaction mixture contains salts and/or oxides of the other cations, preferably the appropriate oxide, carbonate, chloride or sulfate. Hexagonal M-type ferrites have the ideal composition $AFe_{12}O_{19}$ where A is Ba, Sr, Pb and/or Ca. Furthermore, there is a very large variety of ways in which substitution by other cations can take place. Of particular interest is the fact that this process makes it possible to prepare Ba ferrites and Sr ferrites from the cheap minerals heavy spar or barite ($BaSO_4$) and celestite ($SrSO_4$). The ferrites of the spinel type possess the ideal composition $MeFe_2O_4$, where Me is, for example, a divalent cation of Zn, Mn, Co, Cu or Fe, or a plurality of cations of different valencies, eg. Li(I) and Fe(III). The hexagonal ferrites of the Me$_2$Y type have the ideal composition A$_2$Me$_2$Fe$_{12}$O$_{22}$, where A and Me have the above meanings.

The molar amounts in the reaction mixture are so chosen that the ratio of the sum of the number of moles of sodium and the number of moles of potassium to the sum of twice the number of moles of sulfate and the number of moles of chloride is from 0.8 to 1.4. Furthermore, in the preparation of the hexagonal ferrites, it has proved advantageous to employ the alkaline earth metal component in excess, based on the stoichiometric ideal composition.

Further steps in carrying out the novel process are as follows: the individual components in powder form are mixed together in a conventional manner and advantageously milled in order to obtain a homogeneous mixture of the individual substances. The thoroughly mixed and milled mixture is then heated at from 700° to 1,200° C. for from 0.2 to 3 hours. After cooling, a mixture of ferrite, alkali metal sulfate and, if appropriate, alkali metal chloride is obtained; the salts are then removed from this mixture by dissolving them out with water.

The process according to the invention differs from the conventional processes which in general start from —Fe$_2$O$_3$ as the iron(III) component, in particular in that a very finely divided and reactive iron(III) oxide is formed in situ only during the oxidation or the actual reaction of the starting material. At the same time, finely divided sodium sulfate and/or potassium sulfate are formed as by-products. If chlorides are employed in the reaction, alkali metal chlorides are also obtained. The salts melt at low temperatures (in the case of the eutectic composition of 80 mole% of Na$_2$SO$_4$ and 20 mole % of K$_2$SO$_4$, at as low as 830° C.), and form a catalytic liquid phase which promotes rapid transport of the reactants. On the other hand, the salts obtained prevent the resulting ferrite crystals from sintering.

Using the process according to the invention, it is possible to prepare M and Me$_2$Y ferrites belonging to the hexagonal crystal system and spinel-type ferrites belonging to the cubic crystal system, the products being obtained as non-sintered powders and possessing a narrow particle size spectrum; milling, which is disadvantageous in that it results in a broad particle size spectrum and particles containing a large number of defects, is not required. The hexagonal ferrites comprise hexagonal platelets which have a mean diameter of from 0.2 to 2.0 μm, depending on the reaction conditions. The ferrite particles of the spinel type are octahedral, and have a diameter of from 0.1 to 1.0 μm, depending on the reaction conditions and on the chemical composition of the spinel. The ferrite particles crystallize out from the salt melt, during the manufacturing process, in a monodisperse and non-sintered form, and the powders obtained are hence highly dispersible in organic binders, eg. surface coatings and plastics.

Moreover, because the cheap waste product iron(II) sulfate hydrate is used, the process is very economical.

The Examples which follow illustrate the invention. The magnetic properties of the resulting ferrites were determined in a magnetic field of 800 kA/m.

EXAMPLE 1

200 g of FeSO$_4$.7H$_2$O were dehydrated in a cabinet dryer under reduced pressure from a water pump, this procedure being carried out for 1 day at 80° C., for 1 day at 120° C. and then for 1 day at 180° C. The product obtained was then oxidized in a stream of air (100 liters/hour), in a spherical rotary furnace, this procedure being carried out for 0.5 hour at 215° C., for 0.5 hour at 250° C., and then for 1 hour at 350° C. The resulting pale brown, almost completely oxidized product A contained 32.5% by weight of Fe(III), 0.2% by weight of Fe(II) and 57.1% by weight of sulfate.

100 g of product A thus obtained, together with 11.01 g of BaCO$_3$, 50.37 g of Na$_2$CO$_3$ and 16.42 g of K$_2$CO$_3$, were thoroughly ground in a centrifugal ball mill. The mixture was heated in the air, in a Pt dish, for 1 hour at 900° C., and was then cooled. The resulting melt cake was treated with water, filtered off, washed salt-free and dried at 100° C. to give a barium ferrite powder having the following properties: H$_c$=309 kA/m, specific remanence (M$_r$/δ)=43 nTm$^3$/g, S$_{N2}$(BET)=4.3 m$^2$/g. The mean platelet diameter was 0.8 μm.

EXAMPLE 2

100 g of the oxidation product A from Example 1, together with 13.02 g of BaSO$_4$, 55.10 g of Na$_2$CO$_3$ and 17.96 g of K$_2$CO$_3$, were thoroughly ground in a centrifugal ball mill. The mixture was heated in the air, in a Pt dish for 1 hour at 900° C., and was then cooled. The resulting melt cake was treated with water, filtered off, washed salt-free and dried at 100° C. to give a barium ferrite powder having the following properties: H$_c$=306 kA/m, M$_r$/δ=43 nTm$^3$/g, S$_{N2}$=3.9 m$^2$/g. The mean platelet diameter was 0.8 μm.

EXAMPLE 3

102.8 g of the oxidation product A from Example 1, together with 21.2 g of BaCO$_3$, 12.6 g of zinc hydroxide carbonate containing 56.0% by weight of Zn, 50.9 g of Na$_2$CO$_3$ and 16.6 g of K$_2$CO$_3$, were thoroughly ground in a centrifugal ball mill. The mixture was heated in the air, in a Pt dish for 1 hour at 980° C., and was then cooled. The resulting melt cake was treated with water, filtered off, washed salt-free and dried at 100° C. to give a Ba$_2$Zn$_2$Fe$_{12}$O$_{22}$ powder (Zn$_2$Y) having the following properties: H$_c$=0.3 kA/m, M$_s$/δ=32 nTm$^3$/g, S$_{N2}$=4.0 m$^2$/g. The mean platelet diameter was 2 μm.

EXAMPLE 4

89.1 g of the oxidation product A from Example 1, together with 11.7 g of zinc hydroxide carbonate containing 56.0% by weight of Zn, 17.5 g of manganese hydroxide carbonate containing 44.0% by weight of Mn, 44.1 g of Na$_2$CO$_3$ and 14.4 g of K$_2$CO$_3$, were thoroughly ground in a centrifugal ball mill. The mixture was heated in the air, in a Pt dish for 1 hour at 1,100° C., and was then cooled. The resulting melt cake was treated with water, filtered off, washed salt-free and dried at 100° C. to give a single-phase manganese zinc ferrite powder having the following properties: H$_c$=2.5 kA/m, M$_s$/δ=75 nTm$^3$/g, S$_{N2}$=7.1 m$^2$/g. The mean platelet diameter was 0.1 μm.

We claim:

1. A process for the preparation of an M-type ferrite of the formula AFe$_{12}$O$_{19}$, an Me$_2$Y-type ferrite of the formula A$_2$Me$_2$Fe$_{12}$O$_{22}$ or a spinel-type ferrite of the formula MeFe$_2$O$_4$, where A is Ba, Sr, Pb and/or Ca and Me is Zn, Mn, Co, Cu, Fe(II) and/or 1/2(Li(I)+Fe(III)), wherein iron(I) sulfate hydrate is dehydrated under a pressure of less than 0.8 bar at from 50° to 350° C. and then heated in an oxidizing gas stream at from 50° to 600° C., the resulting product is mixed with sodium carbonate and/or potassium carbonate and salts and/or oxides of other A and/or Me cations required in addition to Fe(III) for the particular ferrite composition, the mixture obtained is heated at from 700° to 1,200° C., and the resulting ferrite is then isolated by leaching with water.

2. A process as claimed in claim 1, wherein the iron(II) sulfate hydrate is dehydrated until more than 50% of the water of hydration has been removed, the temperature being progressively increased during this procedure.

3. A process as claimed in claim 1, wherein the dehydrated iron(II) sulfate hydrate is oxidized in a stream of air until more than 80% of the divalent iron has been converted into trivalent iron, the temperature being progressively increased during this procedure.

4. A process as claimed in claim 1, wherein the A and/or Me cations, which are required in addition to the Fe(III) cation for the composition of the particular ferrite, are sulfates, chlorides or carbonates.

* * * * *

UNITED STATES PATENT AND TRADEMARK OFFICE
CERTIFICATE OF CORRECTION

PATENT NO. : 4,469,669

DATED : September 4, 1984

INVENTOR(S) : Hartmut HIBST

It is certified that error appears in the above-identified patent and that said Letters Patent is hereby corrected as shown below:

Claim 1, column 4, line 64, change "iron(I)" to --iron(II)--.

Signed and Sealed this

Thirtieth Day of July 1985

[SEAL]

Attest:

DONALD J. QUIGG

Attesting Officer     Acting Commissioner of Patents and Trademarks